United States Patent
Ribeiro

(10) Patent No.: US 10,245,616 B2
(45) Date of Patent: Apr. 2, 2019

(54) GAS FLOW DEVICE FOR A SYSTEM FOR THE RADIATION TREATMENT OF SUBSTRATES

(71) Applicant: Oerlikon Surface Solutions AG, Pfäffikon, Pfäffikon (CH)

(72) Inventor: Carlos Ribeiro, Ho Chi Minh (VN)

(73) Assignee: Oerlikon Surface Solutions AG, Pfäffikon, Pfäffikon (CH)

( * ) Notice: Subject to any disclaimer, the term of this patent is extended or adjusted under 35 U.S.C. 154(b) by 144 days.

(21) Appl. No.: 15/023,611

(22) PCT Filed: Sep. 5, 2014

(86) PCT No.: PCT/EP2014/002406
§ 371 (c)(1),
(2) Date: Mar. 21, 2016

(87) PCT Pub. No.: WO2015/039732
PCT Pub. Date: Mar. 26, 2015

(65) Prior Publication Data
US 2016/0214138 A1    Jul. 28, 2016

(30) Foreign Application Priority Data
Sep. 20, 2013   (DE) .................. 10 2013 015 580

(51) Int. Cl.
| | |
|---|---|
| B05D 3/06 | (2006.01) |
| B29C 71/04 | (2006.01) |
| B29B 13/06 | (2006.01) |
| B29C 35/08 | (2006.01) |
| B29C 37/00 | (2006.01) |
| F26B 3/30 | (2006.01) |
| B05C 21/00 | (2006.01) |
| B29C 35/04 | (2006.01) |

(52) U.S. Cl.
CPC ............... B05D 3/06 (2013.01); B05C 21/00 (2013.01); B29B 13/06 (2013.01);
(Continued)

(58) Field of Classification Search
CPC .......... B05D 3/06; B05D 21/00; B05D 3/061; B05D 3/064; B05D 3/068; F26B 3/30;
(Continued)

(56) References Cited

U.S. PATENT DOCUMENTS 3,733,461 A * 5/1973 Rohats ................... F24C 7/065
                                                250/493.1
3,986,018 A * 10/1976 Ishii ........................ F21V 29/02
                                                355/30
(Continued)

FOREIGN PATENT DOCUMENTS

DE    1953074 A1   10/1970
DE    9306998 U1   7/1993
(Continued)

OTHER PUBLICATIONS

NPL-1. Wikipedia Contributors. "Fastener" Wikipedia, The Free Encyclopedia. Aug. 28, 2012. <https://en.wikipedia.org/w/index.php?title=Fastener&oldid=509614688>.*

*Primary Examiner* — Matthew J Daniels
*Assistant Examiner* — Leith S Shafi

(57) ABSTRACT

A system for the radiation treatment of substrates, which includes at least one radiation source above the substrate holders in a chamber, which holders are to be equipped with substrates that are to be treated, and the chamber has means for maintaining a gas flow in the chamber, having at least one gas inlet and at least one gas outlet, characterized in that the at least one gas inlet is situated in the vicinity of the substrate holders so that gas flowing in by means of the at least one gas inlet first flows around the substrate holders before either exiting the chamber directly via the gas outlet or exiting after flowing around the at least one radiation source.

4 Claims, 3 Drawing Sheets

(52) U.S. Cl.
CPC ...... *B29C 35/0805* (2013.01); *B29C 37/0092* (2013.01); *B29C 71/04* (2013.01); *F26B 3/30* (2013.01); *B29C 35/045* (2013.01); *B29C 2035/0822* (2013.01); *B29C 2035/0827* (2013.01)

(58) Field of Classification Search
CPC . B29C 71/04; B29C 37/0092; B29C 35/0805; B29C 2035/0827; B29C 35/045; B29C 2035/0822; B29C 35/002; B29C 35/022; B29C 35/0244; B29C 35/025; B29C 35/0277; B29C 35/08; B29C 35/0827; B29C 35/10; B29C 35/00; B29B 13/06; B29B 13/08; B05C 21/00
USPC ...... 250/495.1, 504 R; 392/411, 424; 425/73
See application file for complete search history.

(56) References Cited

U.S. PATENT DOCUMENTS

| | | | | |
|---|---|---|---|---|
| 4,220,865 A | * | 9/1980 | Silverman | B41F 23/005 250/493.1 |
| 4,336,279 A | | 6/1982 | Metzger | |
| 4,563,589 A | * | 1/1986 | Scheffer | B29C 35/08 250/504 R |
| 4,591,724 A | * | 5/1986 | Fuse | B01J 19/123 250/454.11 |
| 4,596,935 A | * | 6/1986 | Lumpp | F21V 7/005 250/495.1 |
| 5,099,586 A | * | 3/1992 | Anderson | F26B 3/283 34/275 |
| 5,641,451 A | | 6/1997 | Orimoto et al. | |
| 5,712,487 A | * | 1/1998 | Adachi | F26B 3/28 250/492.1 |
| 6,072,158 A | | 6/2000 | McNally | |
| 6,456,895 B1 | * | 9/2002 | Aloisio, Jr. | C03C 25/12 427/163.2 |
| 2004/0149936 A1 | * | 8/2004 | Schweitzer | A61L 2/08 250/504 R |

FOREIGN PATENT DOCUMENTS

| | | |
|---|---|---|
| DE | 102004030674 A1 | 1/2006 |
| DE | 102012017230 A1 | 3/2014 |
| EP | 2392442 A1 | 12/2011 |
| FR | 2599485 A1 | 12/1987 |

\* cited by examiner

GAS FLOW DEVICE FOR A SYSTEM FOR THE RADIATION TREATMENT OF SUBSTRATES

FIELD OF THE INVENTION

The present invention relates to a system for the radiation treatment of substrates with electromagnetic radiation such as infrared radiation (IR radiation) for drying substrates and/or ultraviolet radiation (UV radiation) for curing UV-hardened paints.

BACKGROUND OF THE INVENTION

Such systems are used, for example, as a component of paint systems. In such paint systems, the substrate surface is typically cleaned in a first step. This can be done, for example, with air pressure and/or with means for ionizing the surface or by blasting the surface with a liquid medium such as water or an aqueous, alcohol-based, or solvent-containing solution or with a solid such as blasting material or $CO_2$, or by immersing the substrate in an aqueous, alcohol-based, or solvent-containing solution, possibly with the action of waves such as ultrasound waves or microwaves.

In the case of cleaning with liquid media, IR heat waves can even be used for the subsequent drying.

In a second step, the actual paint layer can then be applied according to the invention by spraying on a paint dispersion. This is followed by a step in which the already painted substrate is baked. This can be carried out by means of heating in the ambient air and/or by applying infrared radiation (IR) for example at 50-80° C. This causes the solvent that is usually present in the paint dispersion to evaporate. In the UV-hardened paints that are widely used today, i.e. paints that are cured by means of UV light, this hardening takes place in a step following the volatilization of the solvent. Depending on the application. IR- and/or UV lamps are used in these process steps. In the present description, the process of drying by means of IR radiation and/or the process of curing by means of UV radiation are uniformly referred to as radiation treatment.

In order to prevent solvents from volatilizing freely into the environment and into the work environment, according to the prior art, such processes are carried out in treatment chambers.

This is intended to ensure that a continuous gas exchange takes place in order, for example, to minimize the solvent concentration in the vicinity of the substrate and thus to also accelerate the drying and/or curing process. According to the prior art, as schematically depicted in FIG. 1, the radiation treatment is carried out in a closed chamber 1. The radiation source 9, 9', 9" is provided in the upper pan of the chamber 1 and the substrate holders 11, 11' that are to be equipped with substrates are placed in the lower part. FIG. 1 shows substrate holders in the form of two spindles, which can be equipped with components that are to be irradiated. It would also be possible to place the radiation sources 9, 9', 9" below the substrate holders 11, 11', but this is generally avoided in order not to run the risk of the radiation sources 9, 9', 9" being soiled by paint residues that drip from the substrates.

According to the prior art, the chamber ceiling is provided with an inflow region 7 through which gas, e.g. air, that is fed from an inlet 3 flows into the chamber. According to the prior art, the gas flows past the radiation sources 9, 9', 9" and then past the substrates 11, 11' and into the lower region of the chamber where it is aspirated from the chamber 1 via the outlet 5. Because of this placement according to the prior art, flow and gravity work together so that impurities such as dust and solvent are effectively aspirated away. The gas flow and its direction are schematically depicted by means of arrows in FIG. 1.

The arrangement according to the prior art, however, is disadvantageous in that the gas flow that flows past the substrates must first pass the radiation sources. These are generally hot during operation, which leads to an uncontrolled heating of the gas flow. This means that the substrate holders 11, 11' are acted on by a gas flow that has an indefinite temperature and temperature gradients can even occur across the width of the substrate holders. The process of the drying, and/or curing, however, is strongly influenced by the prevailing temperature. Indefinite temperature conditions therefore very quickly result in an uncontrolled process. Irregularities occur particularly if there are temperature gradients. The problem becomes even more pronounced due to the fact that the radiation sources themselves are generally not temperature-stabilized. In the starting phase, the radiation sources are rather cool, but the heat up considerably after long operation. This problem could in fact be reduced by means of explicit cooling steps carried out at the radiation sources. Such steps, however, involve significant technical complexity and are therefore costly.

According to the foregoing, it would be desirable to have radiation treatment equipment available that could be used to reduce and preferably completely overcome the above-mentioned problems of the prior art.

The object of the invention, therefore, is to create such a system.

SUMMARY OF THE INVENTION

According to the invention, the problems are in principle solved by building up a gas flow in the chamber that flows past the substrates immediately after entering the chamber. Since the gas flow does not previously flow past the radiation sources that may be radiating heat, the temperature of the gas flow is well-defined and can also be easily adjusted to a desired stable value.

The invention and its advantageous embodiments will now be described in detail by way of example in conjunction with the drawings.

DETAILED DESCRIPTION OF THE INVENTION

Figure 1:
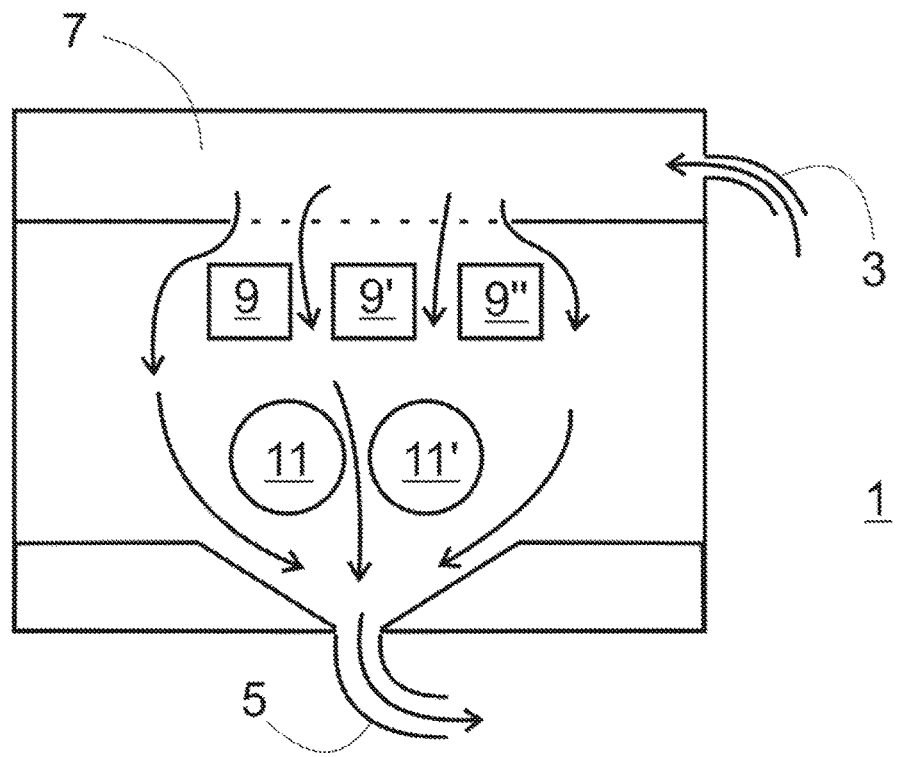
FIG. 1 shows a system for the radiation treatment of substrates according to the prior art.
Figure 2:
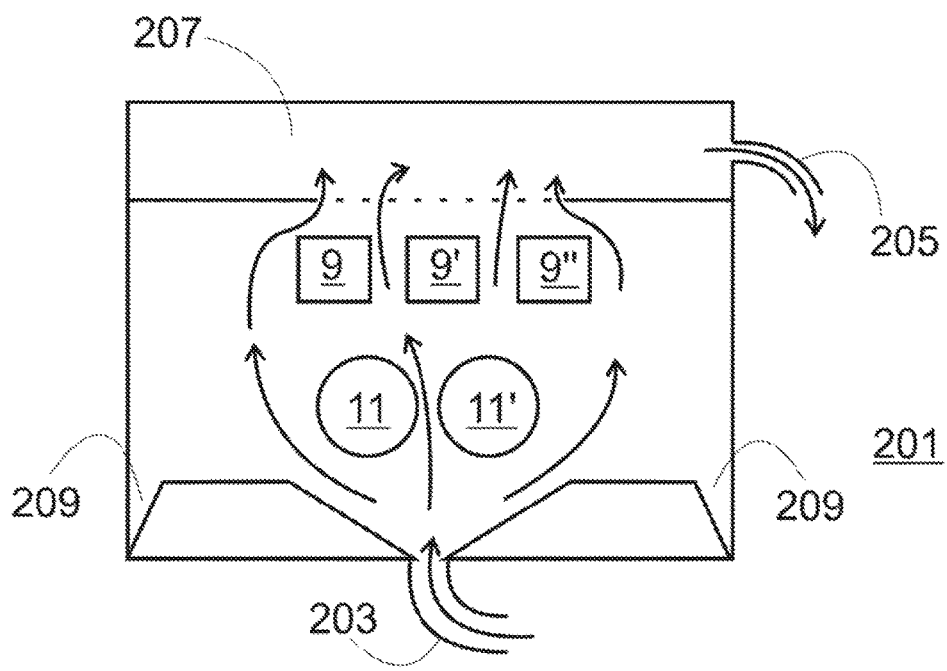
FIG. 2 shows a system according to the invention for the radiation treatment of substrates according to a first embodiment.

FIG. 2 shows a system according to the invention according to a first embodiment. The drawing shows a chamber 201 containing radiation sources 9, 9', 9" and substrates 11, 11' that are to be irradiated. A gas inlet 203 is provided in the chamber, at the bottom in the vicinity of the substrates 11, 11'. According to this embodiment, the gas outlet 205 is provided in the vicinity of the chamber ceiling, which can be preceded by a ceiling chamber 207. During operation of the system, the gas now initially flows past the substrates 11, 11' after traveling into the chamber, before flowing around the radiation sources 9, 9', 9", through the optional ceiling chamber 207, and out via the gas outlet 205. In this way, the temperature of the gas flowing past the substrates 11, 11' is well-defined and the process can take place under predetermined, stable temperature conditions. Recesses 209 that can function as dust collectors are advantageously provided in the edge regions of the chamber.

Figure 3:
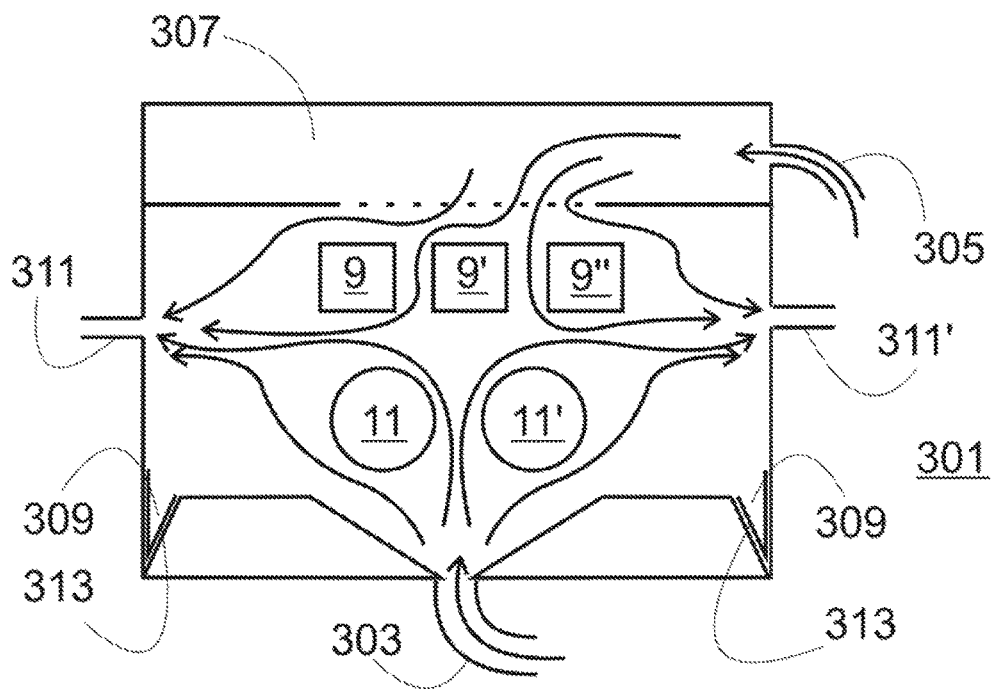
FIG. 3 shows a system according to the invention for the radiation treatment of substrates according to a second embodiment.

A second advantageous embodiment of the present invention is shown in FIG. 3. In this embodiment, a chamber 301, which has radiation sources 9, 9', 9" that are situated above substrates 11, 11', is acted on with gas flows both via a first inlet 303 in the lower region of the chamber underneath the substrates 11, 11' and via a second inlet 305 in the upper region of the chamber above the radiation sources 9, 9', 9". Advantageously, at half the height of the chamber, outlets 311, 311' are provided, which are preferably positioned symmetrically. The two gas flows in this embodiment, as indicated by means of arrows in the drawing, meet at approximately half the vertical height, i.e. between the radiation sources 9, 9', 9" and substrates 11, 11', and exit the chamber interior via the laterally positioned outlets 311, 311'. This particularly preferred embodiment of the present invention has the particular advantage that dust particles that are entrained in the gas flow tend to be transported to the edge of the chamber. If recesses 309 that can function as dust collectors are still provided there, then any dust that is present in the chamber, which is mainly transported toward the outlets 311, 311' but is nevertheless separated out from the gas flow, mainly collects in the dust collector. According to a particularly preferred embodiment, a removable receptacle 313 is respectively provided in each of the recesses 309 so that the dust collects in this receptacle and this dust can be simply discarded by taking the receptacle out and emptying it. Naturally, such a receptacle can also be used in other embodiments of the present invention.

The present application has disclosed a system for the radiation treatment of substrates, which includes at least one radiation source above the substrate holders in a chamber, which holders are to be equipped with substrates that are to be treated, and the chamber has means for maintaining a gas flow in the chamber, having at least one gas inlet and at least one gas outlet, characterized in that the at least one gas inlet is situated in the vicinity of the substrate holders so that gas flowing in by means of the at least one gas inlet first flows around the substrate holders before either exiting the chamber directly via the gas outlet or exiting after flowing around the at least one radiation source.

In the system, the gas outlet can be provided in the vicinity of the at least one radiation source so that the gas, after flowing, around the substrate holders, flows around the at least one radiation source before it exits the chamber via the gas outlet.

The gas outlet can be provided at a height between the substrate holders and at least one radiation source.

In the vicinity of the at least one radiation source, a second gas inlet can be provided so that gas flowing in via the second gas inlet first flows around the at least one radiation source before it meets the gas flowing against the substrate holders and flows together with it out of the chamber through the gas outlet.

At the lower edge of the chamber, recesses can be provided so that the flow is reduced in the vicinity of the recesses and the recesses thus function as dust collectors.

Removable receptacles can be provided in the recesses.

Figure 4:
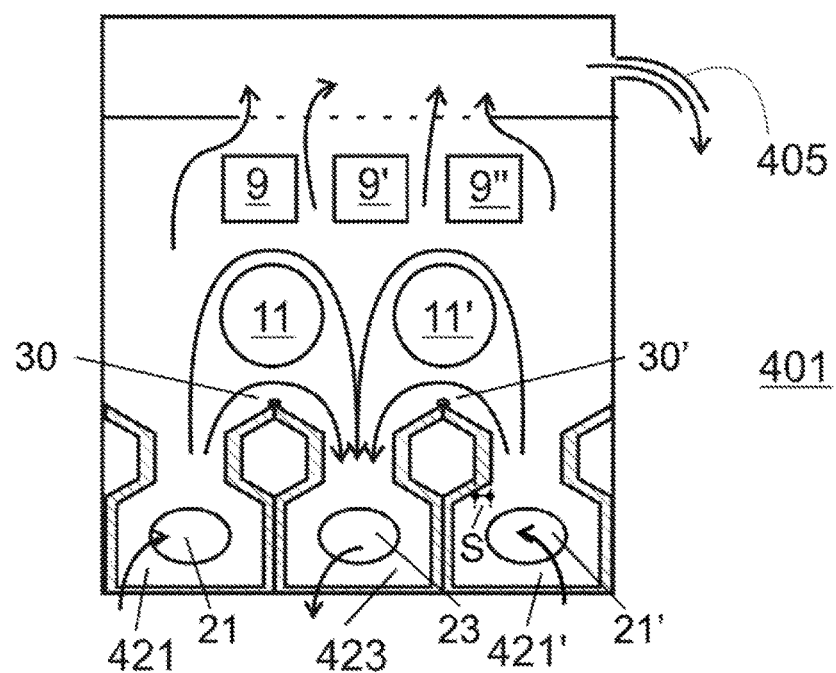
FIG. 4 shows a system according to the invention fix the radiation treatment of substrates according to a third embodiment.
Figure 5:
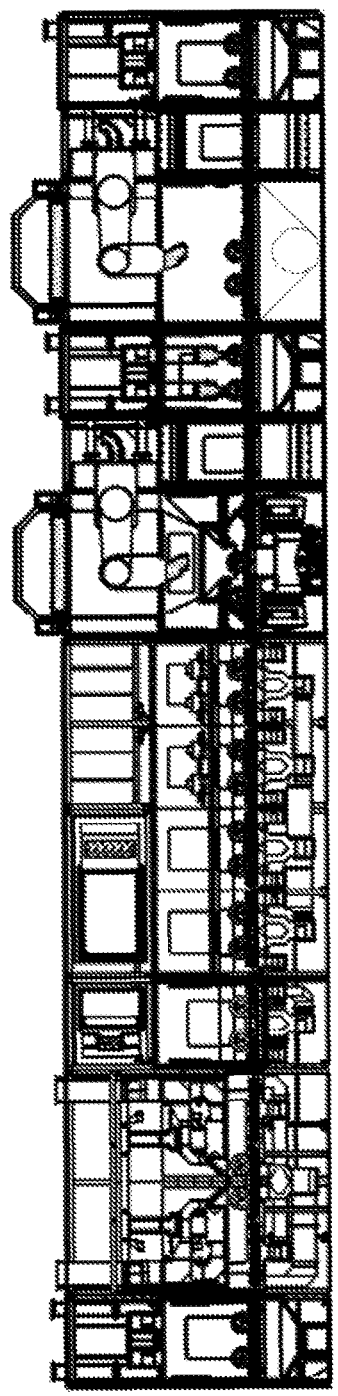
FIG. 5 schematically depicts the possible layout of a paint system that includes radiation treatment chambers according to the present invention.

A third particularly preferred embodiment of the present invention is shown in FIG. 4. In this case, a chamber 401 with radiation sources 9, 9',9", which are situated above substrates 11, 11', is acted on with gas flows via both inlets 421, 421' in the lower region of the chamber, below the substrates 11, 11'. The gas or gases flow(s) around the substrates 11, 11' and exit(s) the chamber partially via a gas outlet 423 in the lower region of the chamber and partially via a gas outlet 405 in the upper region of the chamber. According to the present embodiment, the gas inlet- and/or outlet devices 421, 421' and 423, respectively, include flow conduits that become narrower in one dimension in the flow direction and widen out again further in the flow direction so that an essentially laminar flow is present at least along the gas flow devices and as a result, deposits (e.g. of dust or dirt) do not accumulate due to turbulence phenomena. In a particularly preferred variant of this embodiment, the flow conduits are composed of deformable plate material such as sheet metal. In FIG. 4, these are each shown as having a double-walled design; the two walls are embodied as being spaced apart from each other by a gap S of 20 mm, for example. The gap produces a thermal insulation that is advantageous among other things because temperatures of 100° C. and more can easily occur in the chamber because of the hot air that is used for drying. The gas flows in through the round openings 21, 21' of the gas inlet devices 421, 421' and part of it flows out through the round openings 23 of the gas outlet devices 423.

According to a preferred embodiment of the third variant, the individual gas flow devices have lugs in the upper part, which make it possible to hold two respective gas flow devices together, for example by means of a clamp rail or by means of caps 30, 30', making it possible, for example, to maintain the laminar flow in this region as well.

In particular, the present invention discloses a system for the radiation treatment 401 of substrates, which has at least one radiation source 9, 9',9" in a chamber that is situated above the substrate, holders 11, 11' that are to be equipped with substrates that are to be treated and the chamber has means for maintaining a gas flow in the chamber, with a gas flow device having at least one gas inlet 421, 421' and at least one gas outlet 423, 405, where the gas flow device is situated in the region below the substrate holder (11, 11') and is embodied so that the gas inlet 421, 421' and gas outlet 423, 405 include elements that have flow conduits that become narrower in the flow direction and then widen out again toward the downstream end, as a result of which during operation of the system, a laminar flow essentially prevails at least in the gas flow device and therefore deposits due to turbulence phenomena do not occur.

Preferably, the elements of the system for radiation treatment 401 that constitute the flow conduits are formed out of deformable plates that are preferably composed of sheet metal.

Preferably, at least two of the elements constituting the flow conduits are held together in the upper region by means of rails, clamps, and/or caps 30, 30', which enables a simple assembly or disassembly.

Preferably, the elements constituting the flow conduits are at least double-walled and the at least two walls are spaced apart from each other, thus forming a thermally insulating gap S.

The invention claimed is:

1. A system for the radiation treatment of substrates, comprising:

at least one radiation source positioned above substrate holders in a chamber, which holders are to be equipped with substrates that are to be treated, and the chamber maintains a gas flow that is built up in the chamber and flows past the substrates after entering the chamber, and the gas flow does not previously flow past the at least one radiation source, the chamber having at least one gas inlet and at least one gas outlet, wherein the gas inlet and gas outlet include elements that have flow conduits that become narrower in a flow direction and then widen out again toward a downstream end, as a result of which during operation of the system, a laminar flow prevails and therefore deposits due to turbulence phenomena do not occur, and wherein the gas inlet and the gas outlet have lugs in an upper part, which hold two respective gas inlet and/or gas outlet devices together to maintain the laminar flow in a region in the upper part as well.

2. The system according to claim 1, wherein the elements that constitute the flow conduits are formed out of deformable plates that are composed of sheet metal.

3. The system according to claim 2, wherein at least two of the elements constituting the flow conduits are held together in an upper region by rails, clamps, and/or caps, which enables assembly or disassembly.

4. The system according to claim 3, wherein the elements constituting the flow conduits are at least double-walled and the at least two walls are spaced apart from each other, thus forming a thermally insulating gap.

* * * * *